United States Patent [19]

Vinegar et al.

[11] Patent Number: 5,498,960
[45] Date of Patent: Mar. 12, 1996

[54] NMR LOGGING OF NATURAL GAS IN RESERVOIRS

[75] Inventors: Harold J. Vinegar, Houston, Tex.; Ridvan Akkurt, Mandeville, La.; Pierre N. Tutunjian, Houston, Tex.

[73] Assignee: Shell Oil Company, Houston, Tex.

[21] Appl. No.: 326,561

[22] Filed: Oct. 20, 1994

[51] Int. Cl.⁶ ................................................. G01R 33/44
[52] U.S. Cl. .......................................... 324/303; 324/307
[58] Field of Search ...................................... 324/303, 300, 324/309, 307, 314

[56] References Cited

U.S. PATENT DOCUMENTS

| | | | |
|---|---|---|---|
| 3,657,730 | 4/1972 | Robinson et al. | 324/303 |
| 4,528,508 | 7/1985 | Vail, III | 324/303 |
| 5,122,746 | 6/1992 | King et al. | 324/303 |
| 5,389,877 | 2/1995 | Sezginer et al. | 324/303 |

*Primary Examiner*—Sandra L. O'Shea
*Assistant Examiner*—Raymond Y. Mah
*Attorney, Agent, or Firm*—Del S. Christensen

[57] ABSTRACT

A lithology-independent method of well logging the gas saturation in a reservoir containing natural gas. The method makes use of a pulsed NMR logging tool utilizing a recovery time that is greater than the relaxation time of hydrocarbon gas within the formation. In a preferred embodiment, two different NMR logs are obtained: one with a recovery time significantly shorter than the longitudinal relaxation time, T1, of the gas and one with a recovery time equal to or longer than T1. The amplitudes of the two logs are subtracted and the remainder divided by the hydrogen index of the gas at reservoir conditions to determine the pore volume occupied by gas.

7 Claims, 9 Drawing Sheets

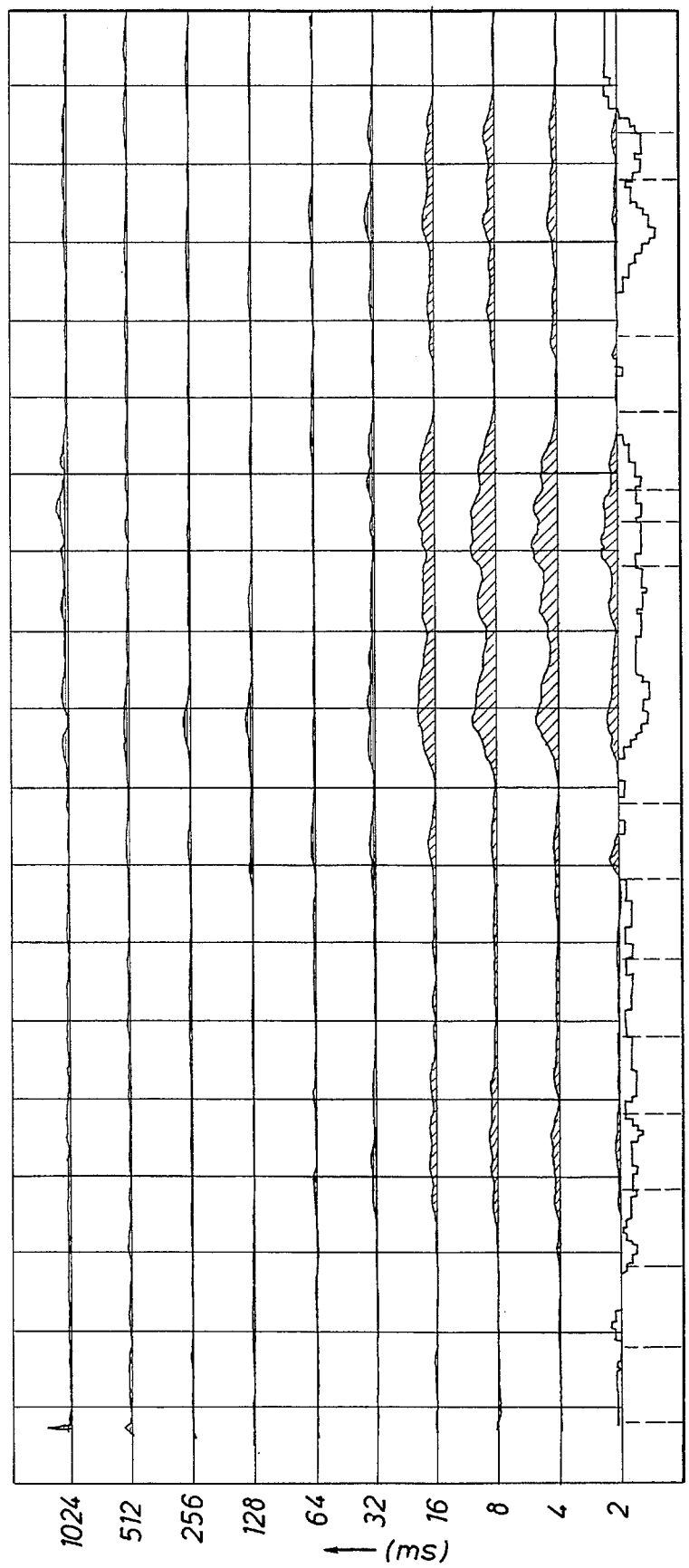

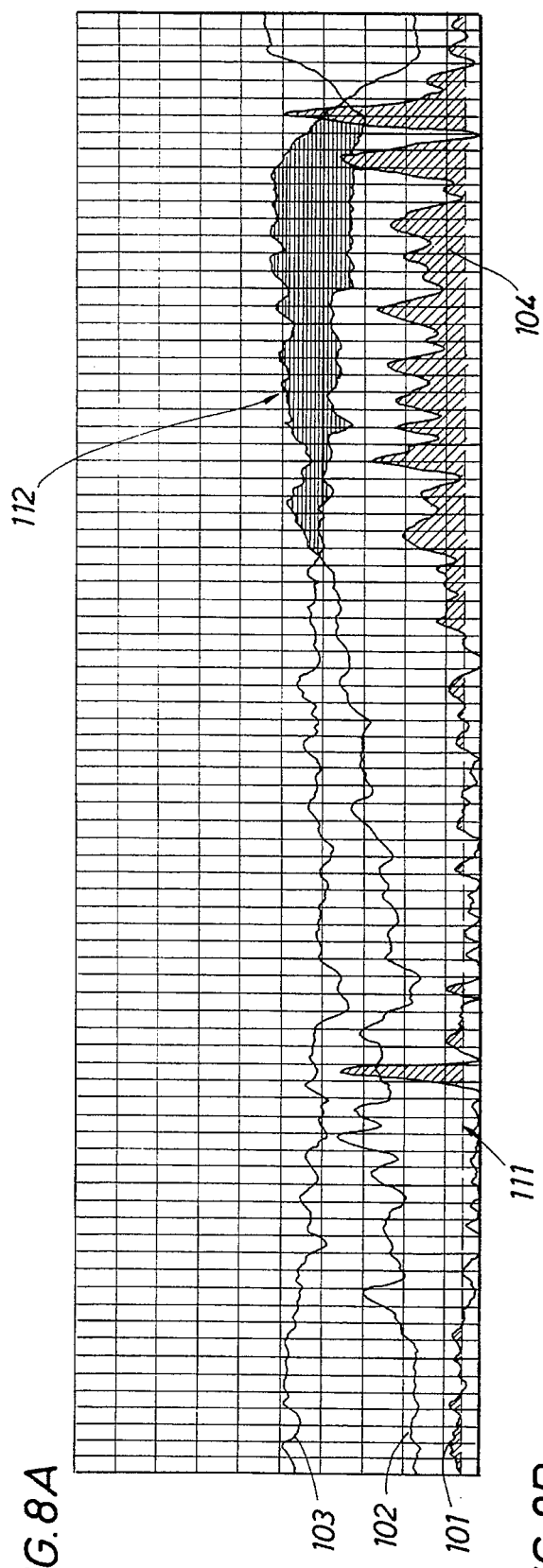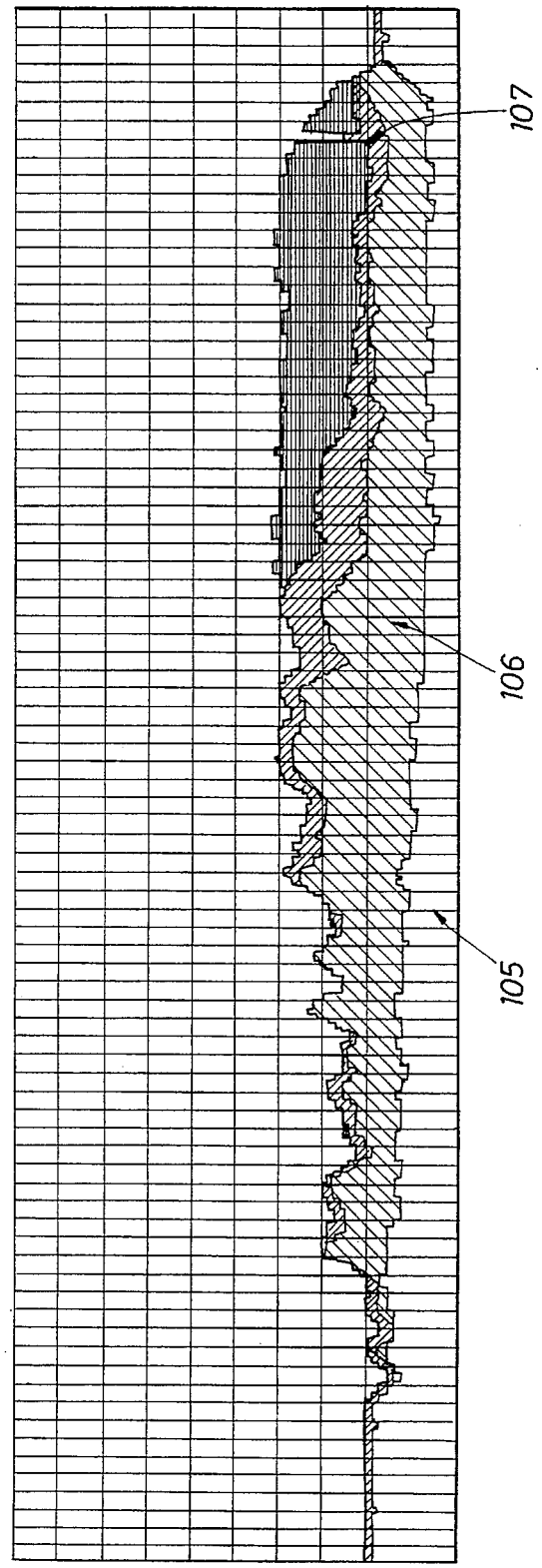
FIG. 8A
FIG. 8B

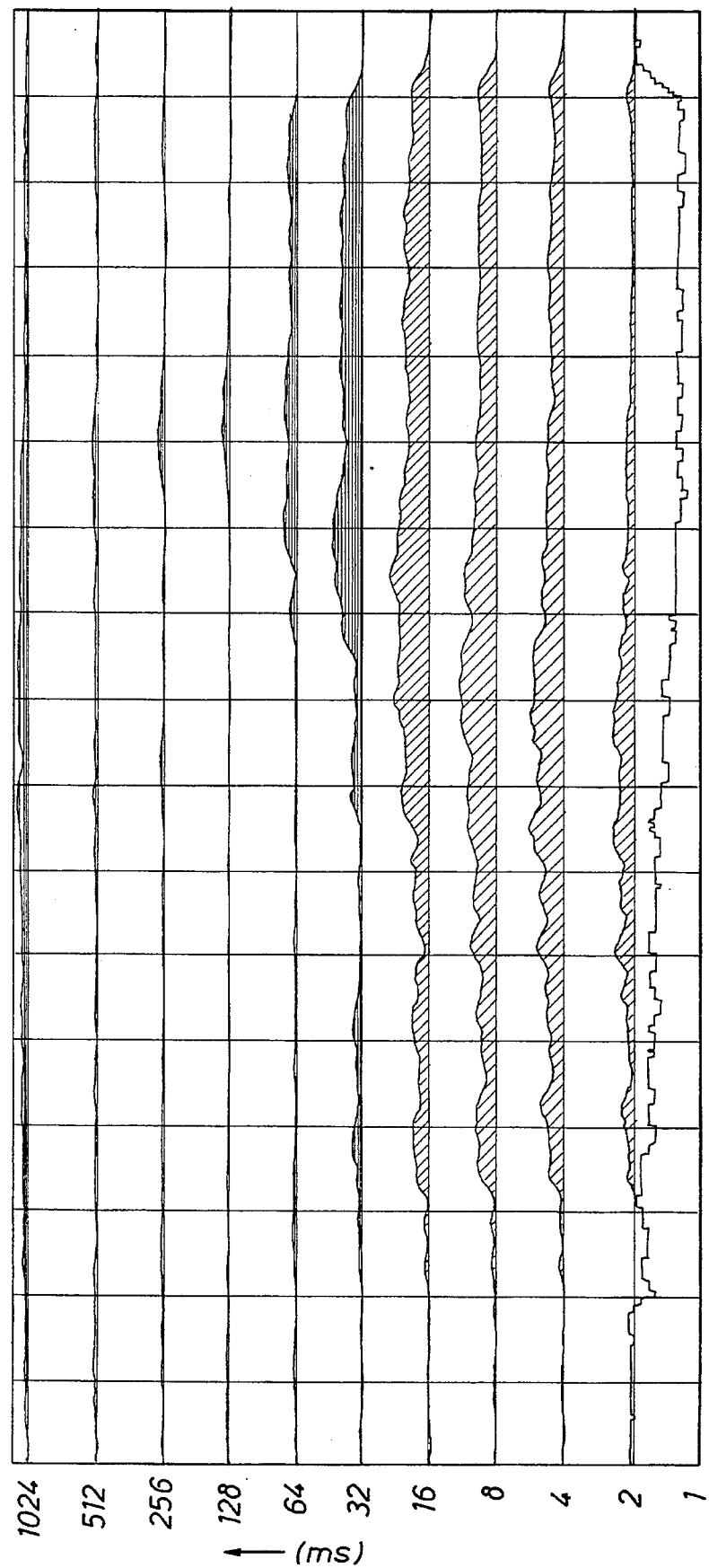

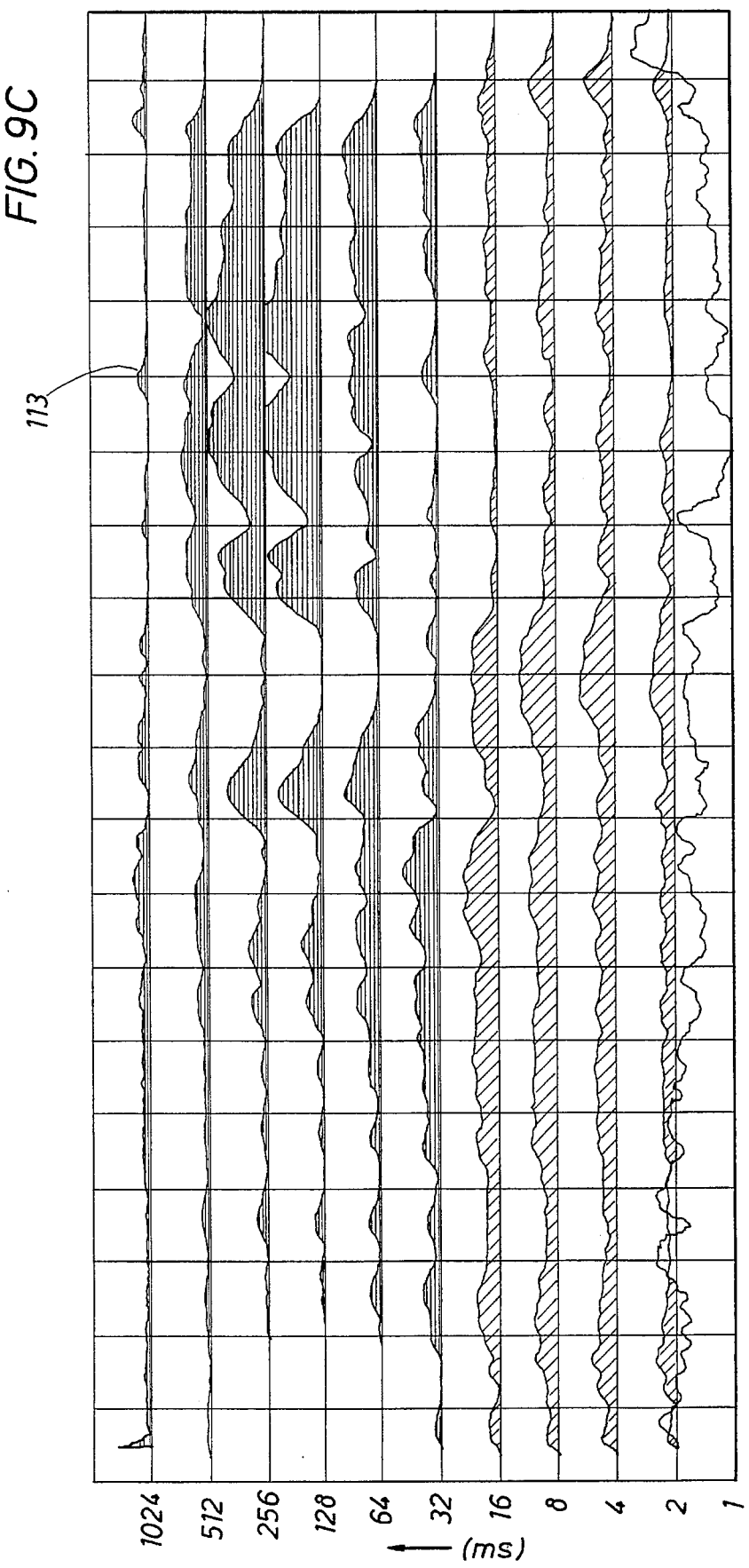

NMR LOGGING OF NATURAL GAS IN RESERVOIRS

FIELD OF THE INVENTION

The invention relates to nuclear magnetic resonance logging of wellbores to determine pore volume occupied by hydrocarbon gas.

BACKGROUND OF THE INVENTION

In the exploitation of hydrocarbon reservoirs, use is made of well logging to determine the amount of recoverable hydrocarbons. Logging tools such as density, neutrons and resistivity logs, have been developed for measurement of reservoir properties such as porosity and water and hydrocarbon saturation of pore space. These tools are widely utilized in the oil industry. However, in order to accurately determine porosity using these tools, the lithology of the rock must be known. Many other rock and fluid properties, such as salinity, cementation factor, saturation exponent, and shaliness, must be known to determine hydrocarbon saturation using a resistivity log. In addition, methods are not known for estimating pore size or permeability in a continuous log, i.e. without taking fluid samples.

Nuclear Magnetic Resonance ("NMR") well logging tools capable of determining the liquid contents of pore volume within a reservoir, and a method to use these tools are described in, for example, U.S. Pat. Nos. 5,309,098, 5,291,137, 5,280,243, 5,212,447, 4,717,878, 4,717,877, 4,717,876, and 4,710,713. In particular, U.S. Pat. No. 5,291, 137 discloses a Carr-Purcell-Meiboom-Gill ("CPMG") pulse sequence and echo response and a method to obtain free fluid porosity, total NMR porosity, bound fluid porosity, spin-spin relaxation time (which is related to pore size distribution in sandstone, and continuous permeability logs. Recovery times between CPMG pulse trains is typically between 0.5 and 1.5 seconds. Because the relaxation time of methane in typical reservoir conditions is greater than three seconds, the total NMR porosity measured in this method could not include the volume occupied by hydrocarbon gas.

Recently, a new logging tool, the MRIL (TM NUMAR Corp. of Malvern, Pa.) has been introduced for determining the liquid-filled porosity in a lithology independent manner, i.e., the tool response does not require a lithology correction to determine porosity. The MRIL uses pulsed nuclear magnetic resonance of the mobile protons in the pore space. However, according to the tool's manufacturer, this tool is not capable of measuring the hydrocarbon gas content of the pore space. For example, Chandler et al. of NUMAR in SPE 28635 "Improved Log Quality with a Dual-Frequency Pulsed NMR Tool" state that "Gas causes an uncorrectable reduction of MRIL porosities. This "gas effect" is a characteristic of all NMR logging tools."

This "gas effect" is a major disadvantage because the main or only hydrocarbon in many reservoirs is natural gas. The pore fluids in these reservoirs consist of only brine and natural gas. The inability to measure gas means that the NMR logging tool will not measure gas-filled porosity and must rely on comparison with other logging tools, such as density and neutron logs, to measure porosity, It is therefore an object of the present invention to provide a method to determine the pore volume occupied by hydrocarbon gas in subterranean formations using a nuclear magnetic resonance log wherein formation properties, other than pore pressure and temperature, do not have to be known. In another aspect of the present invention it is an object to determine the hydrocarbon gas content of a formation wherein the gas content can be determined without knowledge of the properties of the formation rock.

SUMMARY OF THE INVENTION

These and other objects are accomplished by a method to estimate the pore volume that is occupied by hydrocarbon gas in a subterranean formation penetrated by a wellbore, the hydrocarbon gas having a longitudinal relaxation time, the method comprising the steps of:

obtaining a pulsed NMR log using a recovery time that is equal to or greater than the longitudinal relaxation time of the hydrocarbon gas;

determining, from the NMR log using a recovery time that is equal to or greater than the longitudinal relaxation time of the hydrocarbon gas, a distribution of transverse relaxation times that includes transverse relaxation times attributable to the hydrocarbon gas; and estimating the pore volume that is occupied by hydrocarbon gas from the distribution of transverse relaxation times obtained from the NMR log.

In a preferred embodiment, the volume that is occupied by hydrocarbon gas is estimated by further obtaining a second NMR log using a recovery time that is significantly shorter than the longitudinal relaxation time of the hydrocarbon gas. The total signal amplitudes from the first and second NMR logs are subtracted and the remainder divided by the hydrogen index of the gas at reservoir conditions to determine the pore volume occupied by hydrocarbon gas. Alternatively, the volume that is occupied by hydrocarbon gas may be estimated from the first and the second NMR logs by subtracting the distributions of transverse relaxation times of the first NMR log from that of the second NMR log and dividing the remainder by an effective hydrogen index of the gas at reservoir conditions to determine the volume occupied by hydrocarbon gas. In the practice of this embodiment of the present invention, if oil is also present the difference between the two NMR logs may be integrated over ranges of T2 within which the gas responses are expected to differentiate between the gas and oil.

Hydrocarbon gas saturation, or the hydrocarbon gas content of the pore volume, can be accurately measured using pulsed NMR logging tools by using a NMR pulse sequence that includes a recovery time exceeding the longitudinal relaxation time of the gas. Depending upon the other fluid contents of the formations a second NMR log using a pulse sequence that includes a recovery time that is equal to or less than the longitudinal relaxation time of the gas, a density log and/or a gamma ray log may also be required to determine the fluid contents of the formation.

A significant aspect of the present invention is that gas within a formation is always non-wetting. Thus, the longitudinal relaxation time, T1, of the gas will always be that of the bulk gas, not shortened by surface relaxation as are wetting liquids such as brine. T1 of bulk hydrocarbon gas depends only on its temperature and pressure, which are known accurately for most reservoirs. Moreover, the T1 of hydrocarbon gas is generally longer than the T1 of other reservoir fluids, i.e., brine and crude oil.

The NMR signal from the hydrocarbon gas can be measured even in very shaly, tight formations for which the water signal relaxes too quickly to be measured. The high diffusivity of natural gas results in the measured diffusion coefficient being restricted in pores of most rocks for short values of interecho time. In shaly rocks where the water phase has short T1 and short transverse relaxation time, T2, diffusion measurements for the water phase are not possible because the interecho time would have to be too long compared to T1 and T2. However, if one uses natural gas as the diffusional tracer, one can measure the restricted diffusion coefficient even in very shaly rocks.

BRIEF DESCRIPTION OF THE FIGURES

FIGS. 7A through 7C, 8A through 8C, and 9A through 9C show logs of a well including a NMR logs according to the method of the present invention.

DETAILED DESCRIPTION OF THE INVENTION

Nuclear magnetic resonance logging tools can measure four properties: Mo, T1, T2, and D, where Mo is the equilibrium nuclear magnetization, T1 is the longitudinal relaxation time, T2 is the transverse relaxation time, and D is the diffusion coefficient. The first three properties do not require a magnetic field gradient, while the measurement of D requires a magnetic field gradient. The gradient may be either a permanent or pulsed gradient. NMR logging is normally restricted to measuring hydrogen ($^1$H) because of its strong signal and high gyromagnetic ratio.

The NMR log of the present invention is altered from that typically used in the oil industry by extension of the recovery time between pulse sequences to or beyond the longitudinal relaxation time of hydrocarbon gas within the formation being logged. A CPMG echo sequence such as is disclosed in U.S. Pat. No. 5,291,137 can be utilized, along with a NMR logging tool such as the MRIL C available from NUMAR Corp. of Malvern, Pa. The MRIL tool is capable of sensing properties of a portion of a formation that is as much as four or five inches from the wellbore wall. This is preferred because rocks within less than two or three inches from the wellbore wall may be flushed by drilling fluids and not be representative of the formation in general.

Longitudinal relaxation times, T1, of gases such as methane are solely a function of temperature and pressure, and not of other properties of the formation. T1 for methane is discussed in, for example, C. J. Gerritsma, et al., "Proton Spin Lattice Relaxation and Self Diffusion in Methanes—Paper 2", *Physica*, v. 5, 392 (1971). T1 is considered to be proportional to the density and to vary with absolute temperature according to:

$$ln\ (T1) = A - B(1/T) \quad (1)$$

where: A and B are constants and T is the absolute temperature.

Natural gas is composed predominantly of methane and light alkanes. Typically, over 75% by volume of natural gas is methane. Properties of the hydrocarbon gas within a formation can therefore be estimated with sufficient accuracy for the practice of the present invention by assuming a hypothetical hydrocarbon such as a $C_{1.1}H_{4.2}$ hydrocarbon composition.

Figure 1:
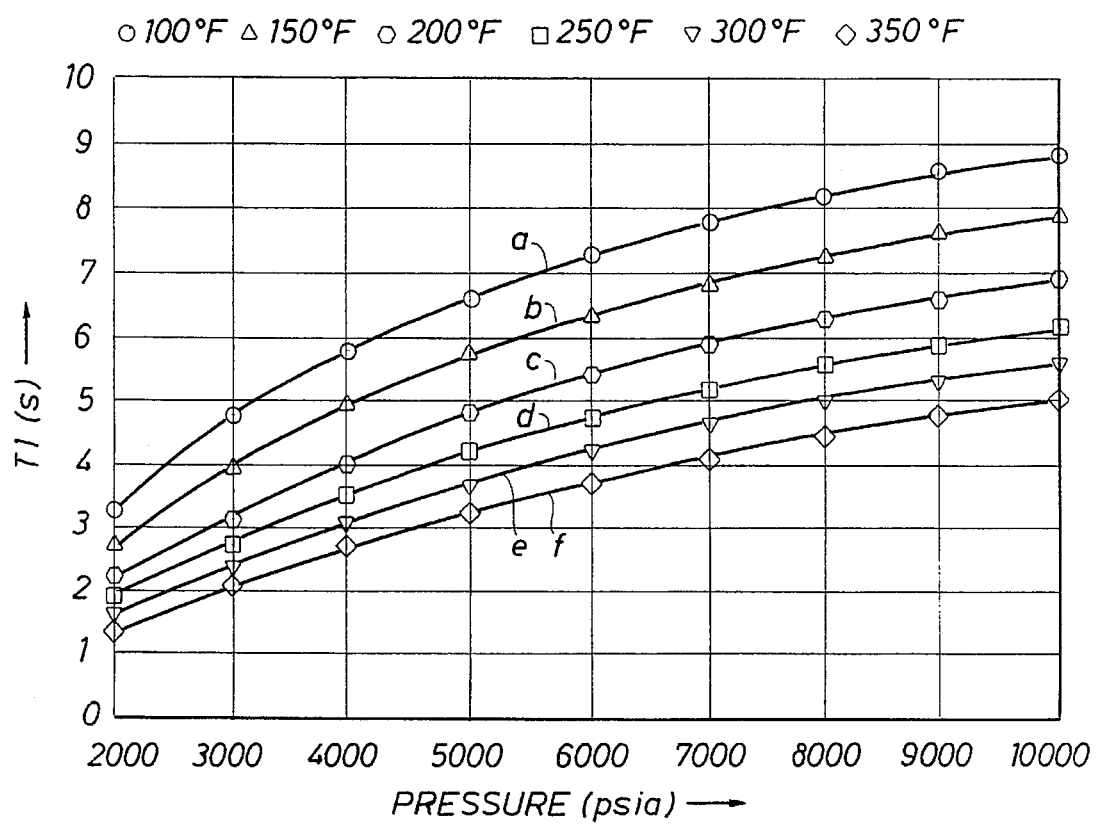
FIG. 1 is a plot of T1 of methane as a function of pressure for different temperatures.

Referring now to FIG. 1, a plot of T1 for a natural gas stream having a composition of $C_{1.1}H_{4.2}$ is shown as a function of pressure for different temperatures. Equation 1 can be used to extrapolate to other temperatures. Lines a through f represent T1, in seconds, for temperatures of 100° F. through 350° F. in fifty degree increments, respectively.

As an example of typical reservoir conditions, methane may have a density of about 0.2 g/cc and a temperature of about 200° F., resulting in a T1 of about four seconds. A recovery time of six seconds will generally exceed T1, and result in a NMR log that is useful in the practice of the present invention. Thus in order not to completely saturate the signal from methane the recovery time ($T_R$) in the CPMG sequence should be greater than four seconds, and preferably between about six and twelve seconds which is two to three times the T1 of gas. T1 of natural gas is between about 3 and 6 seconds for typical reservoir conditions.

Figure 2:
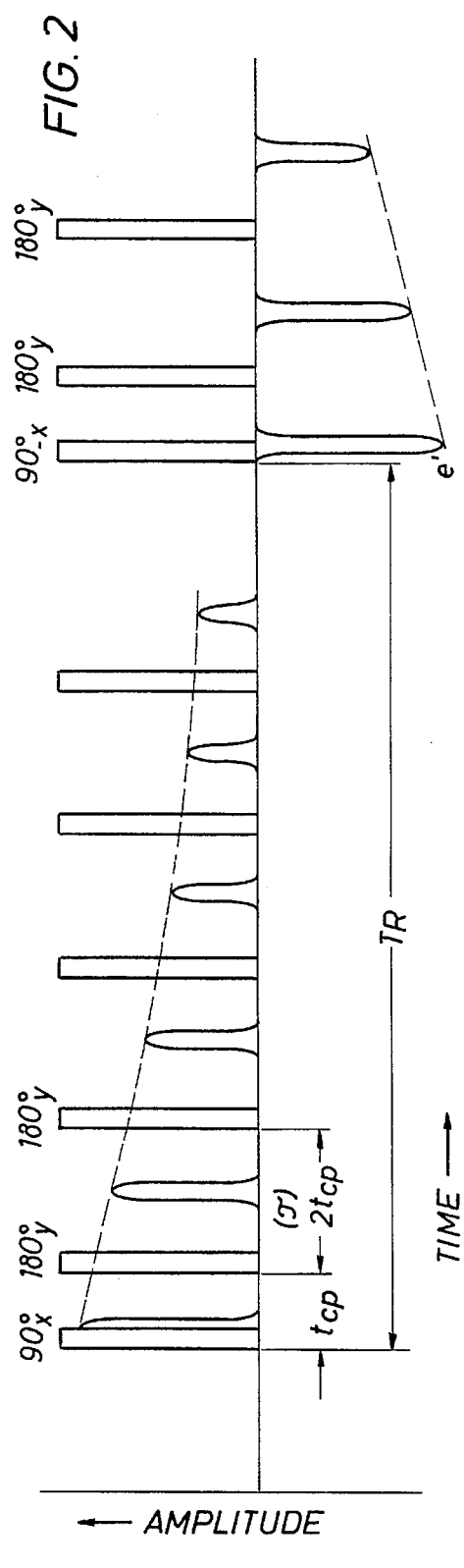
FIG. 2 shows a typical CPMG echo sequence (with phase alternation of the 90° pulse) used for measuring transverse relaxation time, T2.

Referring now to FIG. 2, an exemplary CPMG pulse sequence with phase alternation of the 90° pulse is shown. This pulse sequence is used for measuring transverse relaxation time, T2. The sequence consists of a 90-degree RF pulse (at the Larmor frequency), followed at time $t_{CP}$ by a train of equally spaced 180-degree pulses. The spacing of the 180-degree pulses is $2t_{CP}$. For example in the MRIL C this time can be as short as 1.2 ms. A spin echo, e, is obtained between each of the 180-degree pulses. The sequence is repeated a time $T_R$ later with a 90° RF pulse of opposite phase (relative to the preceding 90° RF pulse). The subsequent train of negative echos, e', is subtracted from the previous train thus building up coherent signals and canceling instrument artifacts.

When there are multiple fluids in the pore space, and a range of pore sizes, the NMR signal, A(t), represents a sum of exponential decays:

$$A(t) = \sum_{i=1}^{n} a_i e^{-\frac{t}{T2_i}} \quad (2)$$

where $a_i$ are constants and $T2_i$ are constants representative of relaxation times, and n is an integer wherein n $T2_i$s are selected at equal logarithmic intervals. Typically, thirty five to fifty intervals, n, result in a fit to the echo data. Time domain data can be inverted using a multiexponential inversion program to yield a histogram, or a plot of $a_i$ as a function of $T2_i$. This inversion is discussed in, for example, U.S. Pat. No. 5,291,137. Relaxation times of components that are bound to solids are generally significantly shorter than components that are not bound to solids. Surfaces in formations are generally either water or oil wet but are not gas wet. Thus, surface relaxation effects are negligible for gases.

A multiexponential inversion of an echo train from a NMR response such as that displayed in FIG. 2 can therefore be expressed as a T2 relaxation time distribution. The ordinate would be the signal amplitude associated with each $T2_i$ time constant by fitting $a_i$ for the given sets of $T2_i$s.

In FIG. 2, the sequence is repeated after a recovery time $T_R$. If $T_R$ is greater than three times T1, then almost complete relaxation will occur. If $T_R$ is not significantly greater than T1, a correction factor, $\alpha$, is applied to account for partial saturation. This correction factor is given by:

$$\alpha = \frac{(1 - e^{\frac{T_R}{T1}})}{M_o} \quad (3)$$

where $M_o$ is the equilibrium nuclear magnetization as measured by the NMR log. However, if $T_R$ is significantly less than T1, then the magnetization will be completely saturated and a signal will not be detected from the gas. Because T1 is significantly shorter for pore water and most crude oils, hydrocarbon gas can be differentiated from water and crude oils by performing two NMR logs, one with a recovery time less than the relaxation time of the gas, and one with a recovery time equal to or greater than the relaxation time of the gas. The gas can be identified as the difference between the two logs.

NMR logs respond to hydrogen content. In the interpretation of NMR logs, a hydrogen index ("HI") is used to convert NMR results to volume basis. HI is the density of hydrogen atoms relative to liquid water at standard conditions. At reservoir conditions, HI is about one for water and hydrocarbon liquids. HI for hydrocarbon gases are known and available in, for example, *Schlumberger Log Interpretation Principals/Applications,* available from Schlumberger Educational Services, Houston, Tex., (1987), in particular, FIG. 5-17, p45. Wherein density and HI of natural gas slightly heavier than methane ($C_{1.1}H_{4.2}$) are shown as a function of pressure and temperature. Under typical reservoir conditions, the gas pressure will be between about 2000 and 10,000 psi and the temperature be between about 100° F. and 350° F., resulting in gas densities between about 0.1 and about 0.3 g/cc and a HI between about 0.2 and about 0.6. Although this HI is less than one, it is still sufficiently large and renders the hydrocarbon gas measurable with the NMR pulse sequence of the present invention.

Figure 3:
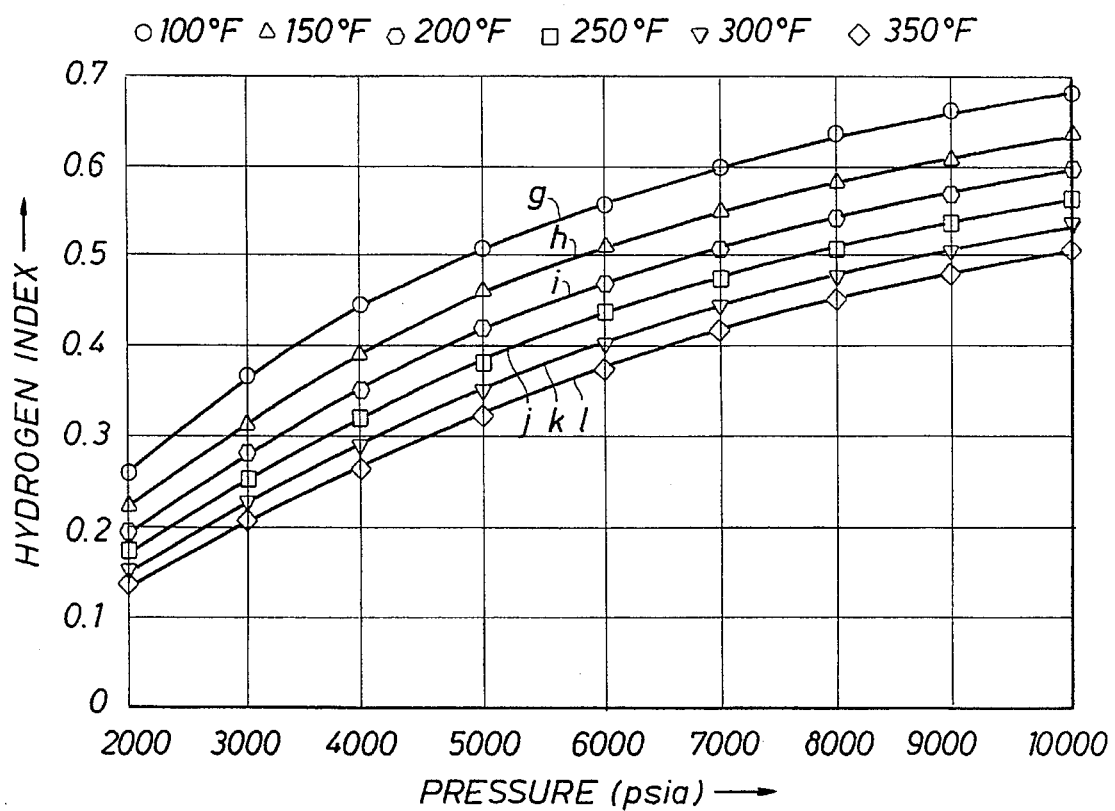
FIG. 3 is a plot of hydrogen index for natural gas as a function of pressure for different temperatures.

Referring now to FIG. 3, a plot of HI for a natural gas having a composition of $C_{1.1}H_{4.2}$ as a function of pressure for different temperatures. Lines g through l represent the HI at temperatures of 100° F. through 350° F. in fifty degree increments respectfully.

The "effective HI" is refereed to herein as the product of $\alpha$ and HI.

NMR therefore measures the density of the fluid phase hydrogen atoms in the portion of the formation being examined. The density of the hydrogen atoms can be converted to a volume fraction, $\phi_{NMR}$, by dividing by HI. The HI of both water and hydrocarbon liquids is almost unity, and so the HI is only applied to gas phase in the following discussions.

If free liquid water and free liquid hydrocarbons are not present in the formation, a single NMR log can be obtained using a recovery time that is equal to or longer than the longitudinal relaxation time of the gas. The signals corresponding to transverse relaxation times greater than a water-gas cut off of, for example, 32 ms, are attributed to gas whereas the signals corresponding to relaxation times less than this water-gas cut off are attributed to water.

When free liquid water is present, but not free liquid hydrocarbons, the volume of gas present can still be found with one NMR log but a density log and a gamma log (for determination of the clay content of the formation) are required. For this method, one begins with an equation for the total density, or bulk density, $\rho_B$, of the formation. If the formation contains clay, water, and gas but no liquid hydrocarbons, it can be expressed as the sum of the density of the components times the volume fraction of the components as follows:

$$\rho_B = (1 - V_{cl} - \phi_w - \phi_g)\rho_{ma} + V_{cl}\rho_{cl} + \phi_w\rho_w + \phi_g\rho_g \quad (4)$$

where $V_{cl}$ is the volume fraction of clay, $\phi_w$ is the volume fraction of water, $\phi_g$ is the volume fraction of gas, $\rho_{ma}$ is the density of the rock matrix, $\rho_{cl}$ is the density of clay, $\rho_w$ is the density of water not bound with clay, and $\rho_g$ is the density of the gas.

Because the NMR log responds to fluids only, the total NMR measured volume fraction is:

$$\phi_{nmr} = \phi_w + \alpha(\phi_g HI_g) \quad (5)$$

Combining equations 4 and 5 to eliminate $\phi_w$ and solving for $\phi_g$ results in the following equation:

$$\phi_g = \frac{\rho_B - (1 - V_{cl} - \phi_{nmr})\rho_{ma} - V_{cl}\rho_{cl} - \phi_{nmr}\rho_w}{\rho_g - \rho_{ma} + \alpha HI_g(\rho_{ma} - \rho_w)} \quad (6)$$

Densities of the individual components may be estimated with relatively good accuracy. Bulk density can be determined from a log such as a gamma-gamma log, and the volume fraction of clay can be determined from a gamma ray log. Thus, equation 6 can be used to estimate the volume fraction of gas with one NMR log, the log being run with a recovery time greater than the longitudinal relaxation time of the gas present, a density log such as a gamma—gamma log, and a gamma ray log.

When two NMR logs are run to determine the amount of gas in the formation, the volume of gas is determined directly from the two logs without a need for any other information. For each log, a $\phi_{nmr}$, and an $\alpha$ are obtained; $\phi_{nmr1}$ and $\alpha_1$ for the log using a recovery time greater than the longitudinal relaxation time of the gas, and $\phi_{nmr2}$ and $\alpha_2$ for the log using a recovery time less than the longitudinal relaxation time of the gas. The two equations for the fluid volume measured by each NMR are as follows:

$$\phi_{nmr1} = \phi_w + \alpha_1(\phi_g HI_g) \quad (7)$$

and $$\phi_{nmr2} = \phi_w + \alpha_2(\phi_g HI_g) \quad (8)$$

The volume fraction of gas can then be found from solving equations 7 and 8 for $\phi_g$ to obtain:

$$\phi_g = \frac{\phi_{nmr1} - \phi_{nmr2}}{(\alpha_1 - \alpha_2)HI_g} \quad (9)$$

Both total amplitudes and T2 distributions resulting from the two CPMG sequences can be subtracted from each other yielding the gas-only signal amplitude and T2 distribution respectively.

When subtracting two CPMG sequences, a zone of interest can either be logged twice, or different pulse sequences may be utilized in the two annuli probed by a tool such as the MRIL C logging tool. The MRIL C logging tool allows separate CPMG sequences at two annuli spaced 0.09 inch apart. One of the CPMG sequences can utilize a long $T_R$ compared to the T1 of methane, the other a $T_R$ that is shorter than the T1 of methane. For example, one $T_R$ can be six to twelve seconds while the other is 1.5 seconds, when the T1 of the gas in the formation at formation conditions is 4 seconds. It is preferred to use the two annuli method rather than logging the zone twice because of depth shifts introduced by having to relog the same zone.

When the formation contains water, light oil, and gas, the pore volume occupied by the gas, and light oil, can be determined, but a NMR tool using a pulsed gradient must be used and two NMR logs must be provided. One NMR log is provided with a relaxation time equal to or greater than the longitudinal relaxation time of the gas and one NMR log is provided with a relaxation time less than the longitudinal relaxation time of the gas. Light oils, like gas, can have a relatively long T1, and therefore not have T2 distributions that cancel when the T2 distributions are subtracted. The NMR response attributable to the gas and light oil are identified on a plot of the difference between the two logs by the location on a plot of responses vs. T2 of the two responses. To know which response is due to gas and light oil, relaxation mechanisms for the components present must be understood.

The relaxation mechanisms that affect T1 and T2 in rocks are (1) molecular motion in fluids, (2) surface relaxivity at the pore wall, and (3) molecular diffusion in magnetic field gradients.

The first mechanism, due to local motions such as molecular tumbling, is called bulk relaxation. Transverse relaxation times are equal to longitudinal relaxation times when the predominant relaxation mechanism is bulk relaxation. Bulk relaxation is the predominant relaxation mechanism for liquid water and hydrocarbon liquids. T1 that is expected of a hydrocarbon liquid, $T1_o$, in ms can be estimated as a function of the viscosity, $\mu$, in cp, of the hydrocarbon liquid according to:

$$T1_o = \frac{1200}{\mu^{0.9}} \tag{10}$$

The second relaxation mechanism is surface relaxation at the pore wall, or the relaxation of $^1H$ nuclei when they closely approach paramagnetic ions such as iron and manganese which reside on grain surfaces. This is the dominant mechanism for fluid molecules such as water that wet the rock surfaces. However, because gas is always non-wetting and never closely approaches the rock surface, this mechanism is negligible for gas. This relaxation is generally very rapid.

The third relaxation mechanism is the diffusion of molecules in magnetic field gradients. This relaxation mechanism affects only T2 and not T1. Therefore, when diffusion is a prominent relaxation mechanism, T2 will differ from T1. Diffusion is a predominant relaxation mechanism only for gas.

Unrestricted diffusion will be the lower limit of the range of T2 within which the gas NMR responses are to be expected. The upper limit is set by the restricted diffusion.

Using a CPMG sequence, the relaxation time due to diffusion (T2D), when diffusion is unrestricted by pore size is:

$$T2D = \frac{3}{\gamma^2 G^2 D_o t_{CP}^2} \tag{11}$$

where $\gamma$ is the $^1H$ gyromagnetic ratio (26,741 radians/s-gauss), $D_o$ is the unrestricted diffusion coefficient, G is the field gradient created by the NMR tool, and $t_{CP}$ is half of the CPMG pulse spacing.

Figure 4:
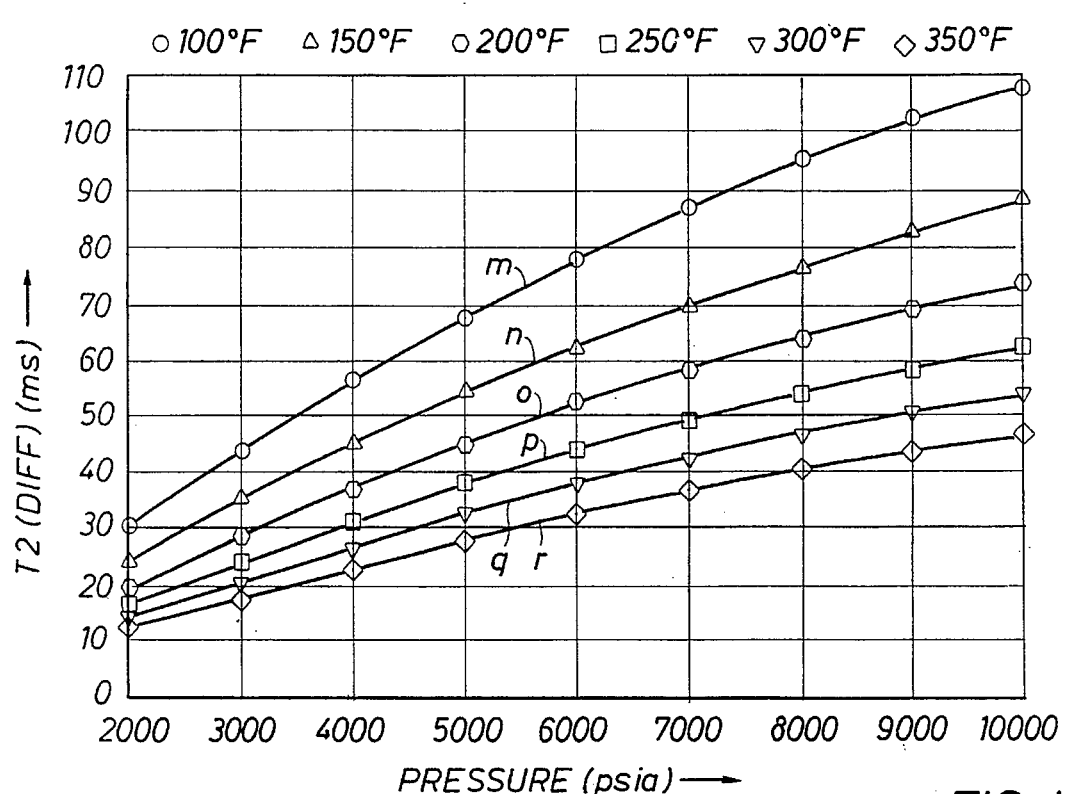
FIG. 4 is a plot of T2 for natural gas for a T2 for unrestricted diffusion, as measured by a MRIL C logging tool, as a function of pressure for different temperatures.

$D_o$ of supercritical methane as a function of temperature and density can be found, for example, in Gerritsma et al., supra, and also in Dawson et al., *AIChE Journal*, Vol 16, No. 5, 1970. Under typical reservoir conditions, methane will have a density of about 0.2 g/cc, and a diffusion coefficient about 50 times that of water, or about $109 \times 10^{-5}$ cm$^2$/s compared to $2 \times 10^{-5}$ cm$^2$/s for water. Thus, using equation (11), if unrestricted bulk diffusion occurred, with the MRIL C logging tool (G=17 gauss/cm, $t_{CP}$=0.6 ms), T2D would equal 37.1 ms. Referring now to FIG. 4, T2D for diffusion that is unrestricted by pore diameters is shown plotted as a function of pressure for temperatures of 100° F. to 350° F. in fifty degree increments as lines m through r respectively, using the parameters of the MRIL C tool.

A ratio of the restricted diffusion coefficient D', over the unrestricted diffusion coefficient, $D_o$, approaches a limit of the inverse of the tortuosity as the fluids diffuse through many pores. Tortuosity is defined as the product of the formation resistivity factor, F, and the formation porosity, $\phi$. The formation resistivity factor can be determined, for example, using an induction log, and the porosity can be determined from a density or neutron log. The upper limit of the range within which the gas NMR responses are to be expected is therefore the relaxation time due to diffusion with restricted diffusion, T2D', which is:

$$T2D' = \frac{3}{\gamma^2 G^2 D' t_{CP}^2} \tag{12}$$

Figure 5:
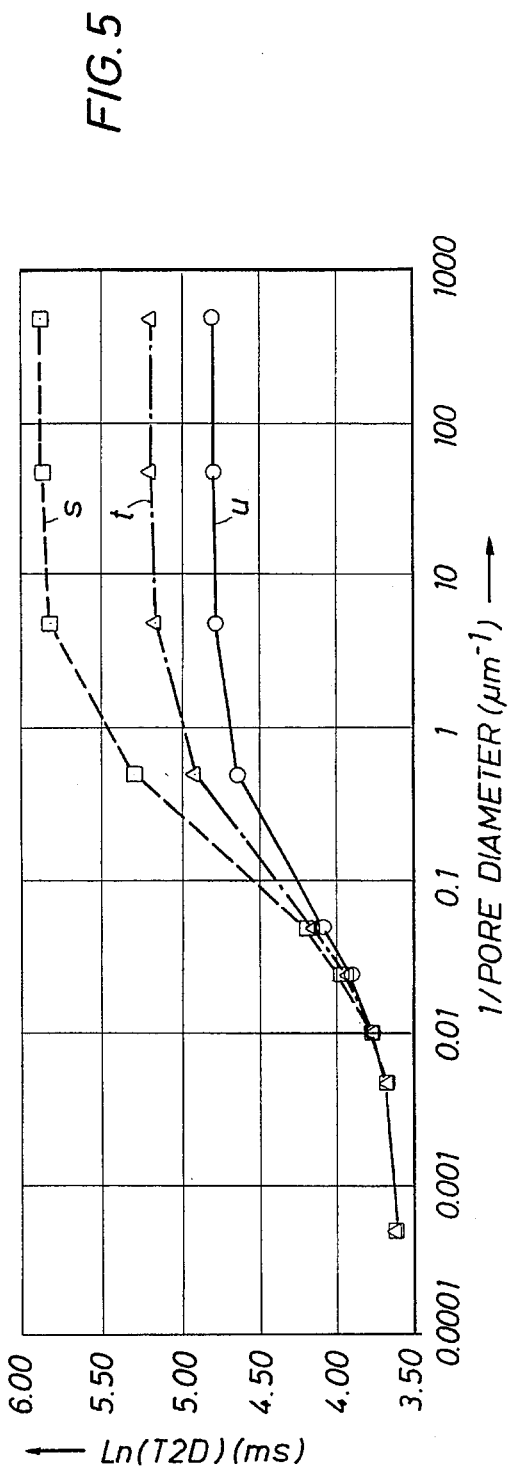
FIG. 5 is a plot of the log of T2 for natural gas for a T2 of methane for diffusion restricted relaxation for different porosities as a function of the inverse of the pore diameter as measured by a MRIL C logging tool.

Referring now to FIG. 5, the log of T2D' is shown for methane as a function of the inverse of the pore diameter for porosities of 10, 20 and 30% as lines s, t, and u respectively.

Given the range of T2 within which the gas peak is expected to fall, and the expected location of the hydrocarbon liquid peak based on the viscosity of the hydrocarbon liquids expected within the formation, the peaks of the difference between the T2 distributions from the two NMR logs can be separated into a gas peak, and a hydrocarbon liquid peak. The pore volume occupied by each of the gas and the liquid hydrocarbon are then calculated by integrating the area under the peaks and dividing the integrated area of the gas peak by the HI of the gas at formation conditions. Taking into account the correction factor, $\alpha$, from equation 3, based on the T1 for the gas for the NMR log having a $T_R$ that is longer than the longitudinal relaxation time of the gas, $\alpha(\tau_L, T1_g)$, and the $T_R$ that is shorter than the longitudinal relaxation time of the gas, $\alpha(\tau_S, T1_g)$, the pore volume occupied by gas, $\phi_g$, can be found as:

where $\Delta P$ is the difference between the T2 distributions from the two NMR logs, expressed as a function of T2.

$$\phi_g = \frac{\int_{T2D}^{T2D'} \Delta P(T2) dT2}{HI[\alpha(\tau_L, T1_g) - \alpha(\tau_S, T1_g)]} \tag{13}$$

The pore volume occupied by liquid hydrocarbon, $\phi_o$, can be found as the integrated area under the difference between the two NMR logs over an interval around the expected $T2_o$ of $T2_o \pm \xi$ where $\xi$ is selected based on the width of the hydrocarbon liquid peak by:

$$\phi_o = \frac{\int_{T2_o-\epsilon}^{T2_o+\epsilon} \Delta P(T2) dT2}{[\alpha(\tau_L, T1_o) - \alpha(\tau_S, T1_o)]} \tag{14}$$

where $\alpha(\tau_L, T1_o)$ is $\alpha$ according to equation 3 for the NMR log having a $T_R$ that is longer than the longitudinal relaxation time of the gas and the T1 of the hydrocarbon liquid, and $\alpha(\tau_S, T1_o)$ is based on the NMR log with a $T_R$ that is shorter than the longitudinal relaxation time of the gas and T1 of the hydrocarbon liquid.

The MRIL C tool has a depth-of-investigation of 16 inches. In an eight inch diameter borehole, the formation can be examined up to four inches of the bore hole wall. Oil-based muds have low invasion to this depth and are therefore the preferred drilling mud for practice of this invention. With low invasion oil-based muds the gas saturation observed by the MRIL C logging tool will be unflushed. In particular, ESCAID 110 oil-based drilling mud with 80% ESCAID 110 and 20% CaCl2-saturated water has been found to provide very little invasion and is therefore a preferred system.

EXAMPLES

Figure 6:
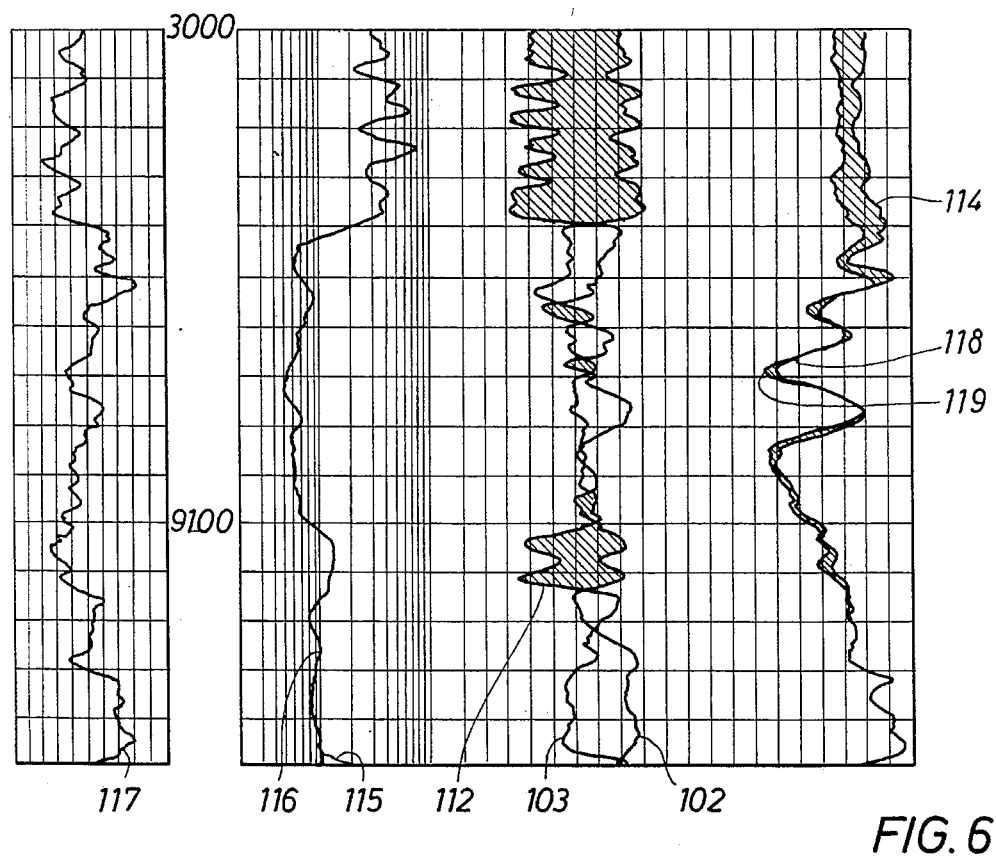
FIG. 6 is a well log obtained by the method of the present invention.

A Gulf of Mexico well was logged twice to demonstrate the preferred mode of the present invention. A MRIL C logging tool and a CPMG echo sequence with phase alternation was used. The recovery times were six seconds and three seconds. The estimated relaxation time of any hydrocarbon gas expected to be in the formation was four seconds. The formation was known to contain gas, but not liquid hydrocarbons. Inversions of the CPMG data was performed as described above to obtain relaxation time distributions. These distributions were integrated from a relaxation time of 32 ms to 1024 ms, representing hydrocarbon gas. Conventional logs were also obtained. Referring now to FIG. 6 a neutron log (indicative of porosity), 103, and a density log (gamma-gamma log), 102, are shown plotted as a function of depth. Conventionally, a neutron-density log "cross-over", shown as area 112 is considered to indicate a presence of gas. Induction resistivity is shown as lines 115 and 116. GR is shown as line 117. The result of the two NMR logs are shown as lines 118 and 119, with the difference between them area 114.

Figure 7A:
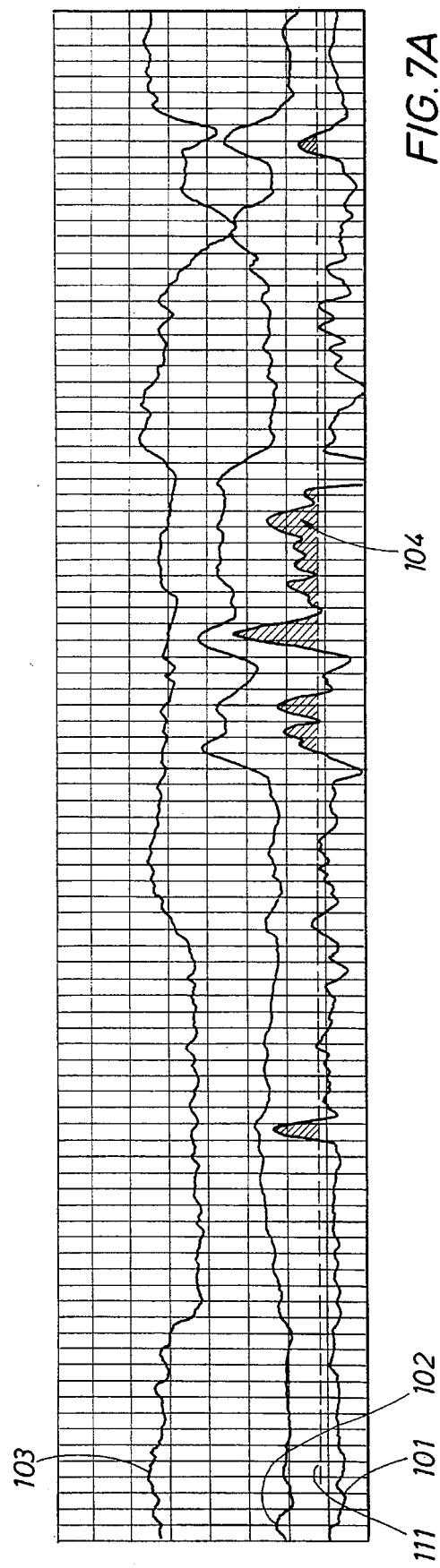

Another Gulf of Mexico well was logged using a MRIL C logging tool and a CPMG echo sequence with phase alternation to demonstrate a one NMR log embodiment of the present invention. The recovery time was six seconds, which exceeded the estimated four second relaxation time of any hydrocarbon gas expected to be in the formation. The formation was known to contain gas, but not liquid hydrocarbons. Inversions of the CPMG data was performed as described above to obtain relaxation time distributions. These distributions were integrated from a relaxation time of zero to 2 ms representing clay-bound water, between 2 ms and 32 ms, representing non-clay bound water, and greater than 32 ms, representing hydrocarbon gas. Conventional logs were also obtained. Referring now to FIG. 7A a neutron log (indicative of porosity), 103, a sonic log, 101 and a density log (gamma-gamma log), 102, are shown plotted as a function of depth. Conventionally, a neutron-density log "cross-over" is considered to indicate a presence of gas. In this segment of the log, the lines touch at one point, but do not cross. The sonic log is also an indicator of gas in this formation. When the sonic log reading exceeds the level indicated by line as shown by shaded area 104, presence of gas is indicated.

Figure 7B:
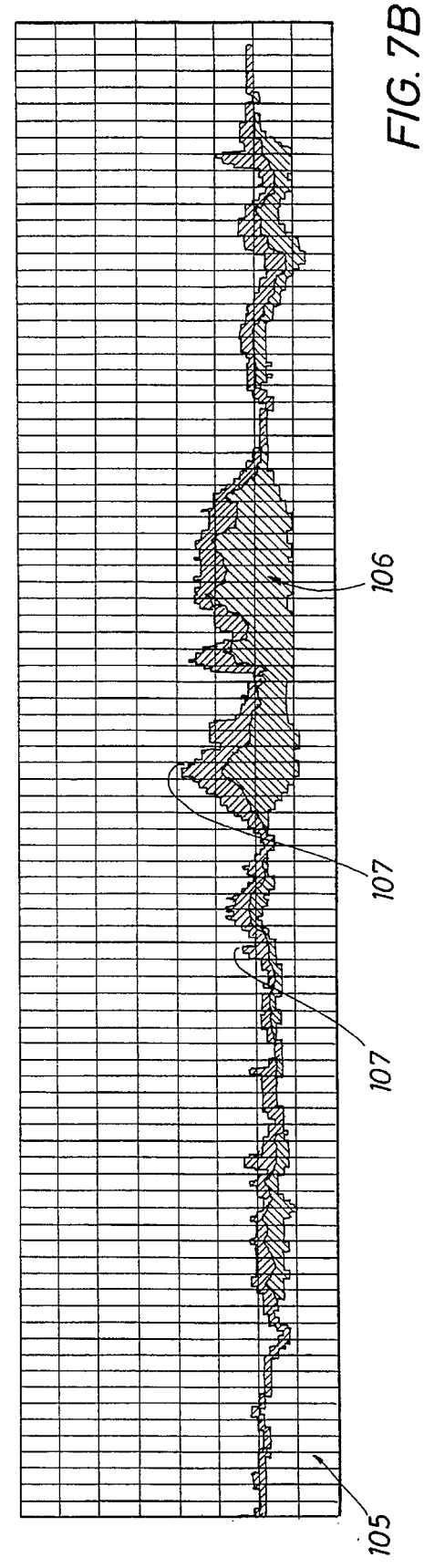

Referring now to FIG. 7B, results of the NMR log are shown plotted as a function of depth, with depths aligning with FIG. 7A. Bound water, as indicated by signals representing relaxation times less than about 32 ms, is plotted as areas 105, which is clay bound water, and 106, which is capillary bound water. Gas is indicated by area 107 from signals representing relaxation times from 32 ms to 1024 ms. Oil-based drilling mud filtrate is evident at material having greater than 1024 ms relaxation times. As can be seen by comparing FIG. 7A with FIG. 7B, gas is present where conventional means, such as density-neutron crossover, indicate no gas is present. The explanation for this is that the density-neutron crossover has been suppressed by shaliness.

The present invention can be better understood with reference to FIG. 7C, in which NMR responses representing intervals of relaxation times are plotted as a function of depth. The depths again align with the depths of FIGS. 7A and 7B. The NMR responses representing relaxation times less than 2 ms are plotted on the bottom, responses representing relaxation times between 2 and 4 ms are plotted at the line labeled 2 ms, with the intervals increasing geometrically. The responses indicating relaxation times greater than 1024 ms indicate invasion of oil based drilling mud into the zone being examined by the NMR.

Figure 9A:
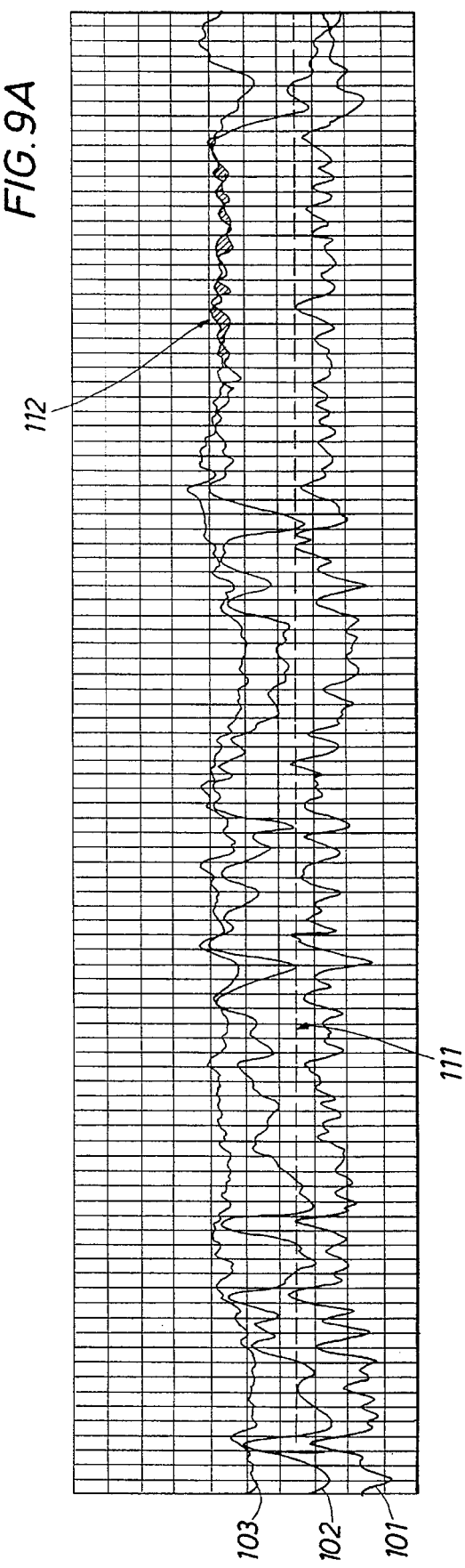
Figure 9B:
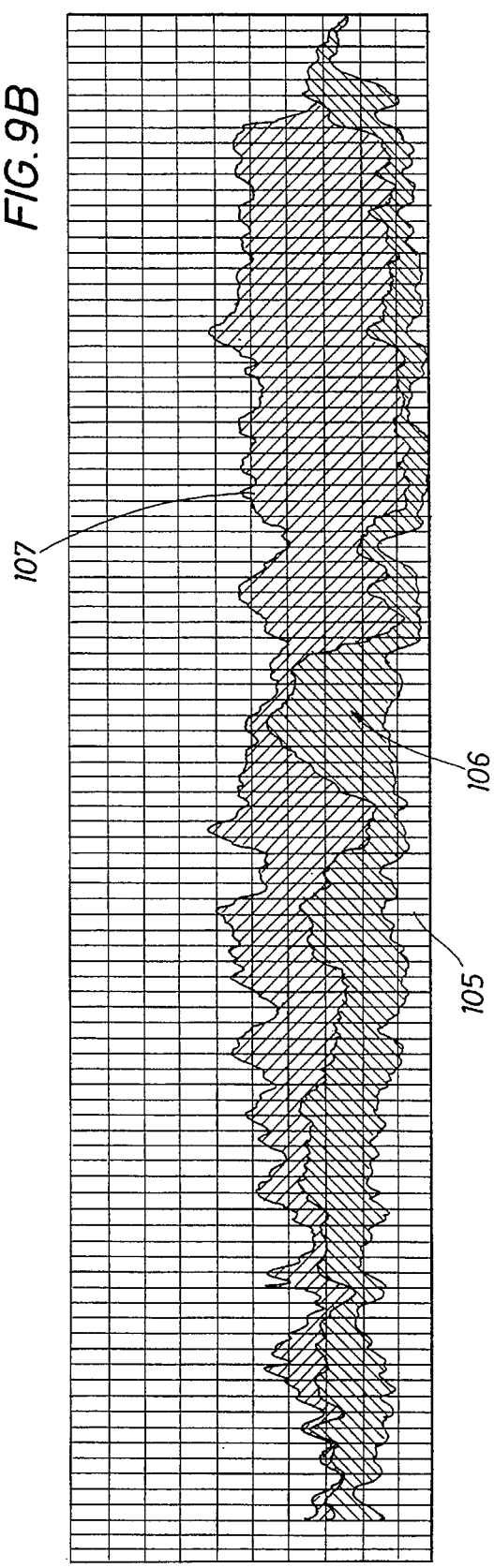

FIGS. 8A through 8C, and 9A through 9C, correspond to FIGS. 7A through 7C respectively showing logs for different segments of the wellbore. FIGS. 8A through 8C show in particular logs of a segment of formation containing a significant amount of gas that does correlate with a neutron-density crossover as area 112 for the neutron-density crossover and 107 as the gas indicated by the NMR. Additionally, FIG. 8C shows significant oil invasion as responses greater than 1024 ms for a portion of the log. FIGS. 9A through 9C show in particular a response of a formation containing some gas, 112 and 107, and a considerable amount of non-bound water, 113.

These examples demonstrate the usefulness of the present invention to determine the presence of hydrocarbon gas in a formation using a NMR log.

We claim:

1. A method to estimate the pore volume that is occupied by hydrocarbon gas in a subterranean formation penetrated by a wellbore, the hydrocarbon gas having a longitudinal relaxation time, the method comprising the steps of:

obtaining a pulsed NMR log using a recovery time that is equal to or greater than the longitudinal relaxation time of the hydrocarbon gas;

determining, from the NMR log using a recovery time that equal to or greater than the longitudinal relaxation time of the hydrocarbon gas, a distribution of transverse relaxation times that includes transverse relaxation times attributable to the hydrocarbon gas; and estimating the pore volume that is occupied by hydrocarbon gas from the distribution of transverse relaxation times obtained from the NMR log.

2. The method of claim 1 further comprising the step of obtaining a second NMR log using a recovery time that is significantly shorter than the longitudinal relaxation time of the hydrocarbon gas, and wherein the distribution of relaxation times attributable to hydrocarbon gas is determined from the NMR log using a recovery time that is significantly shorter than the longitudinal relaxation time of the hydrocarbon gas and the NMR log using a recovery time that is equal to or longer than the longitudinal relaxation time of the hydrocarbon gas by subtracting distributions of transverse relaxation times from the two NMR logs.

3. The method of claim 1 wherein a density log is used along with the distribution of transverse relaxation times obtained from the NMR log to estimate the pore volume occupied by hydrocarbon gas.

4. The method of claim 1 wherein the NMR log is a pulsed NMR log.

5. The method of claim 1 wherein the NMR log utilizes a Carr-Purcell sequence.

6. The method of claim 2 wherein the NMR log is a pulsed NMR log and the NMR log utilizes a Carr-Purcell sequence.

7. The method of claim 1 further comprising the step of estimating the relaxation time of the hydrocarbon gas.

\* \* \* \* \*